Nov. 25, 1969  R. J. MARTIN  3,479,795
AUTOMATIC PACKAGING APPARATUS
Filed Oct. 31, 1966  5 Sheets-Sheet 1
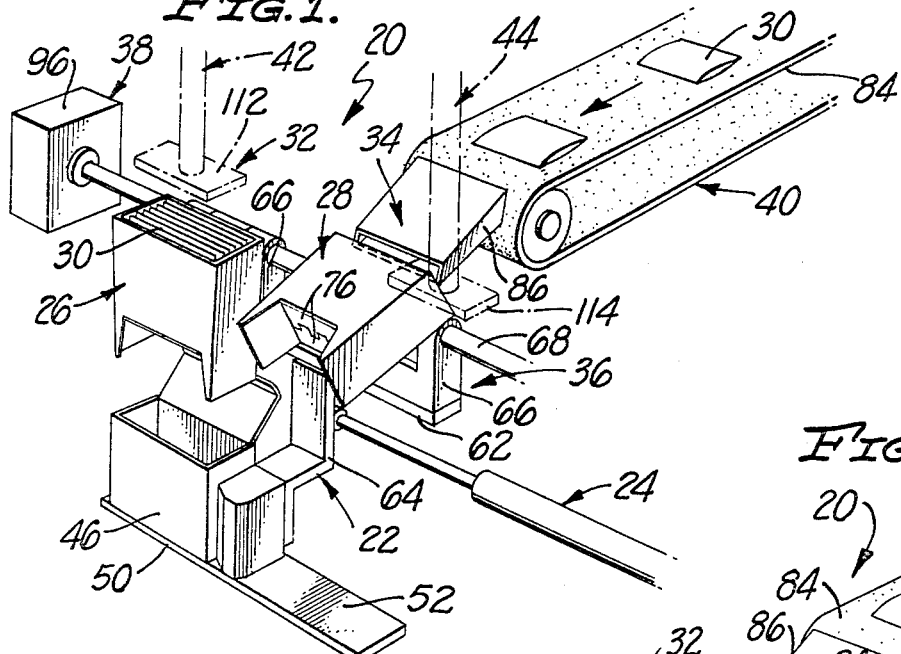
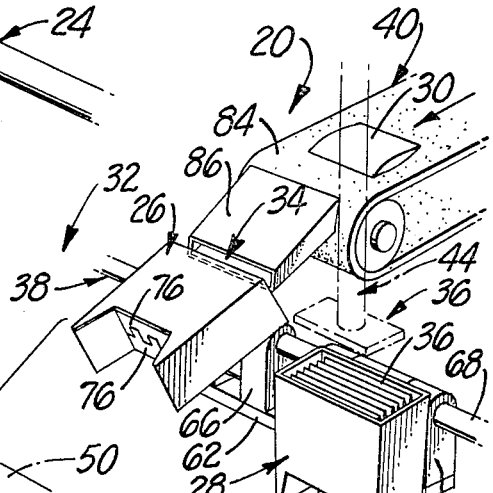
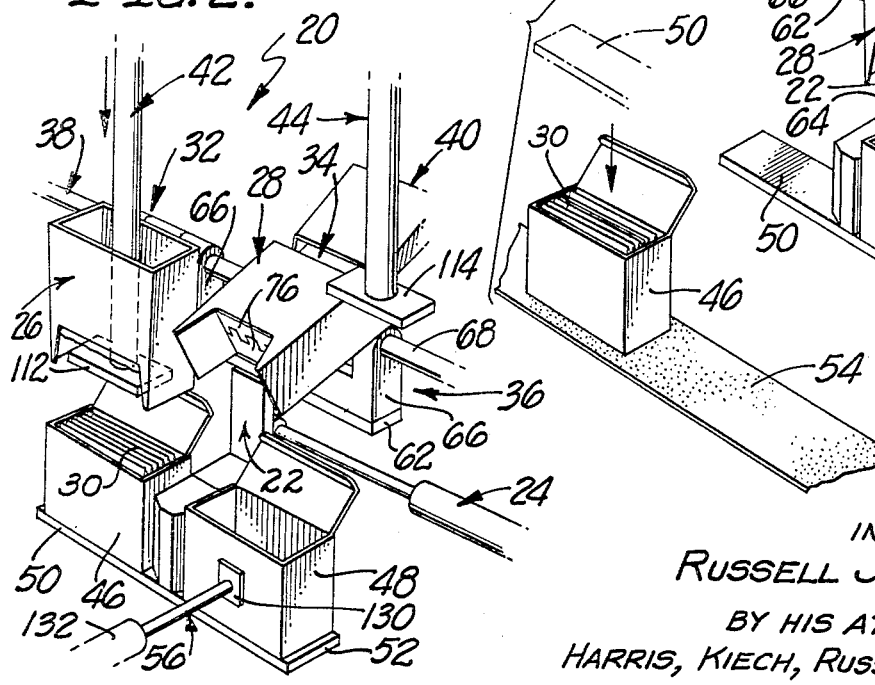
INVENTOR
RUSSELL J. MARTIN
BY HIS ATTORNEYS
HARRIS, KIECH, RUSSELL & KERN

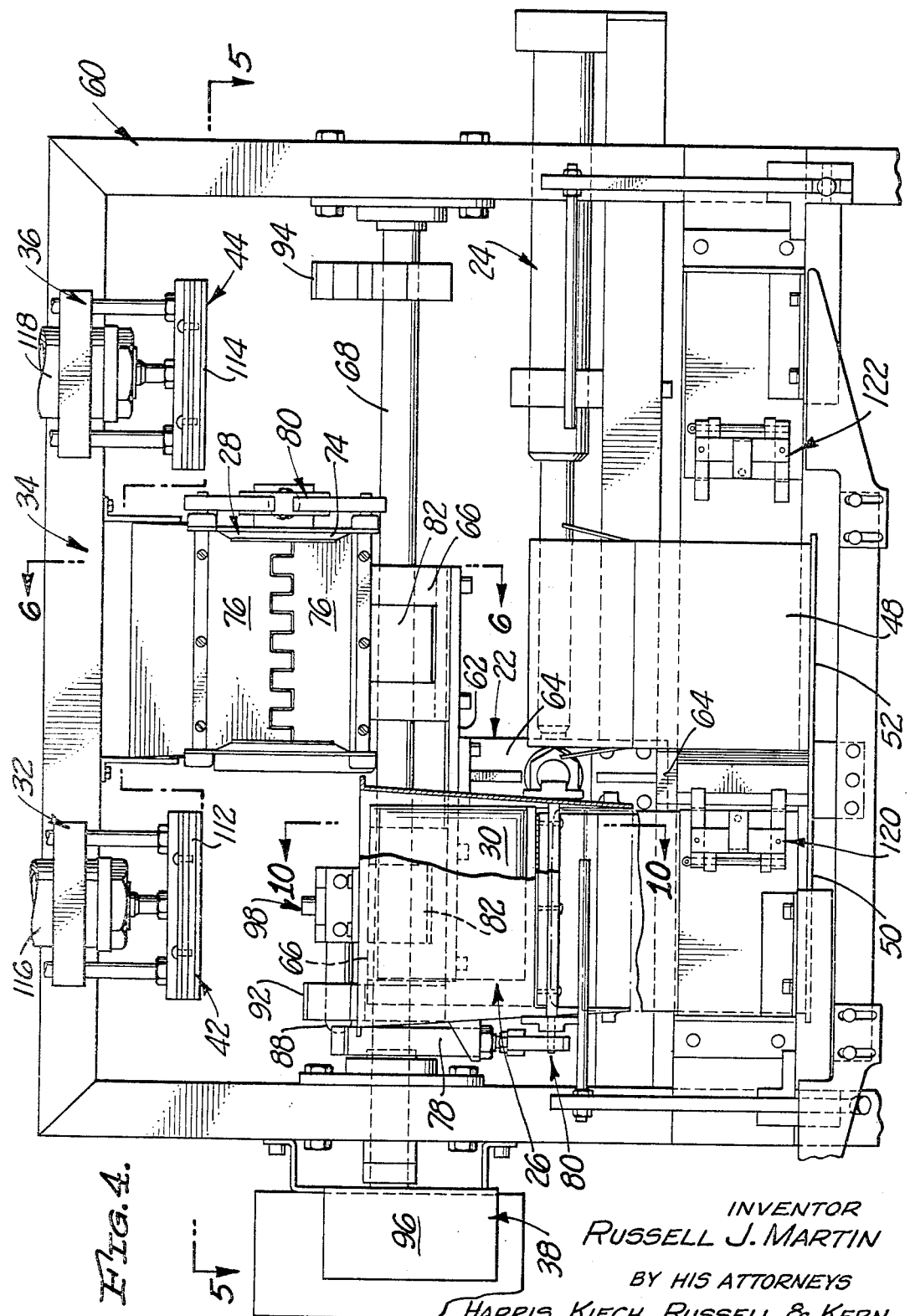

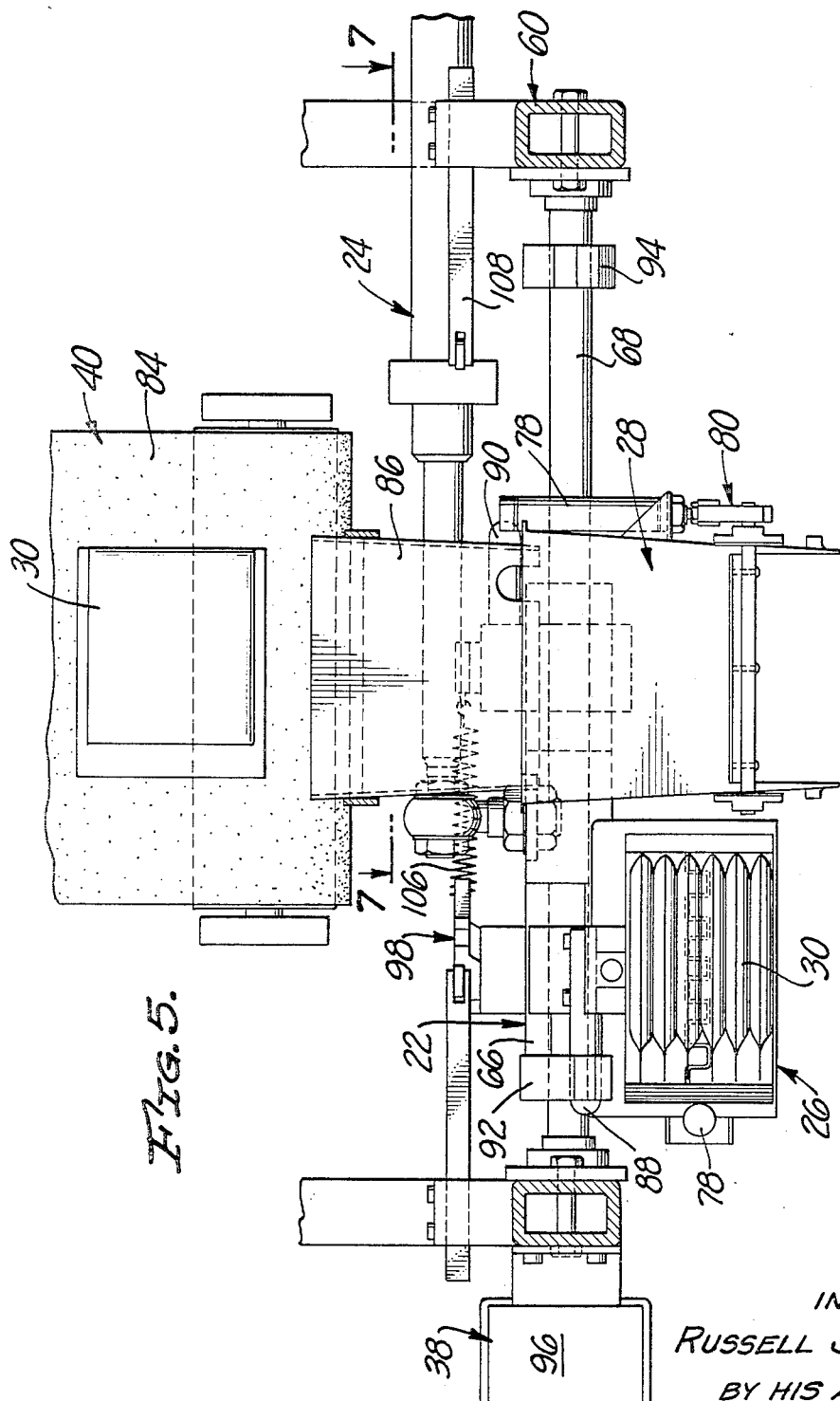

Nov. 25, 1969     R. J. MARTIN     3,479,795
AUTOMATIC PACKAGING APPARATUS
Filed Oct. 31, 1966     5 Sheets-Sheet 4
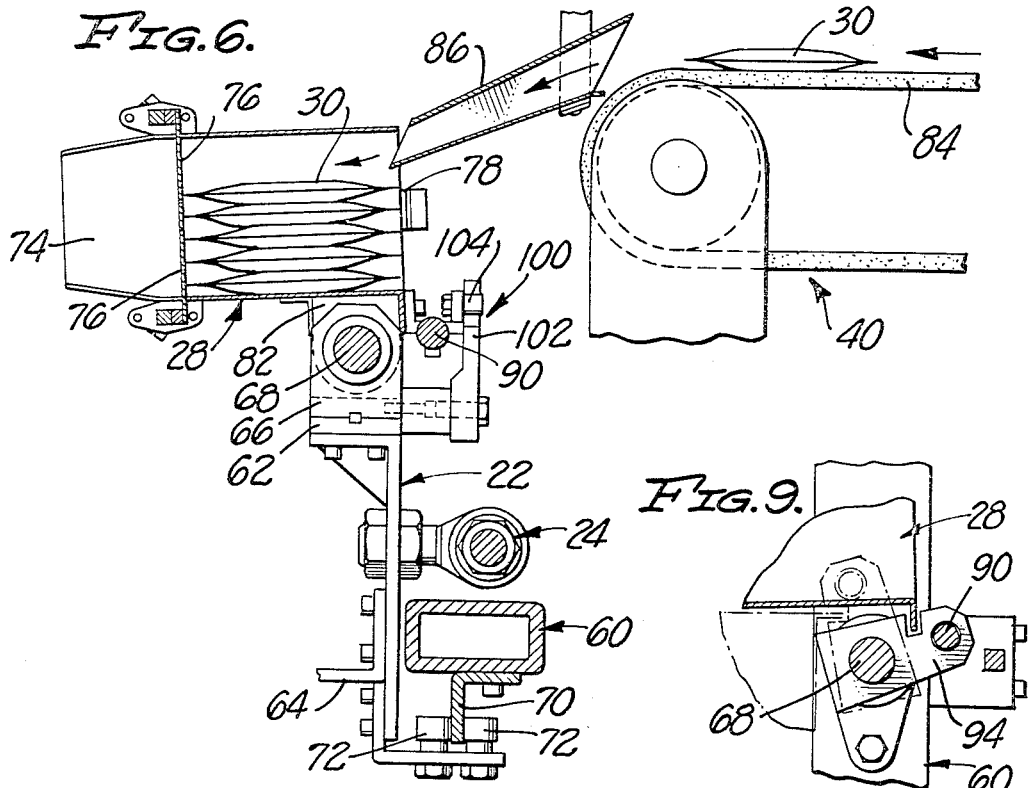
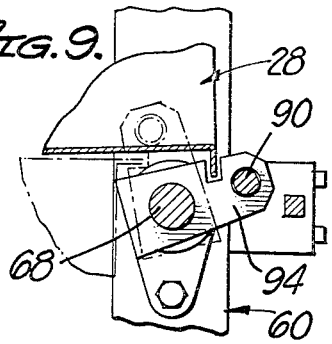
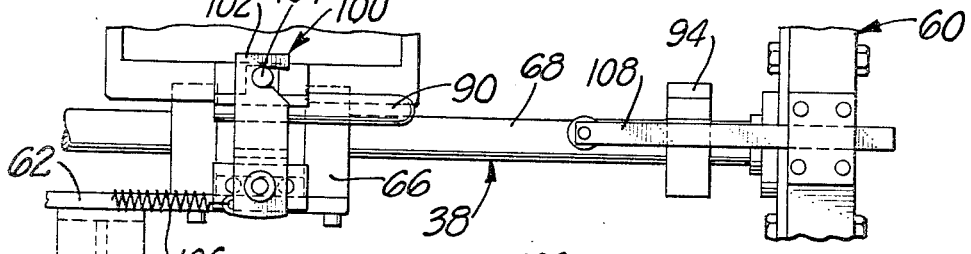
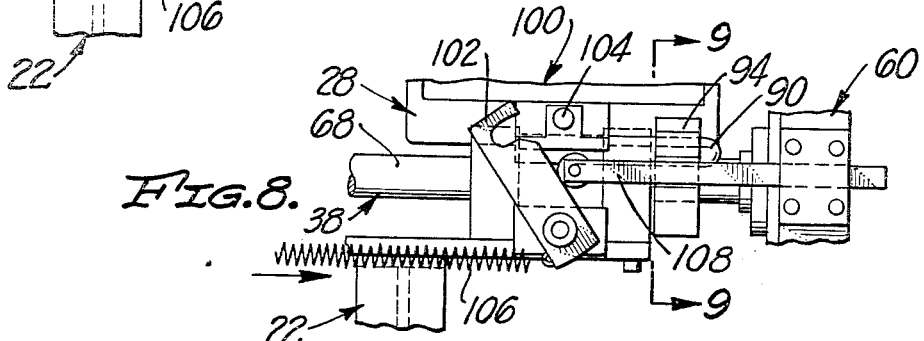
INVENTOR
RUSSELL J. MARTIN
BY HIS ATTORNEYS
HARRIS, KIECH, RUSSELL & KERN

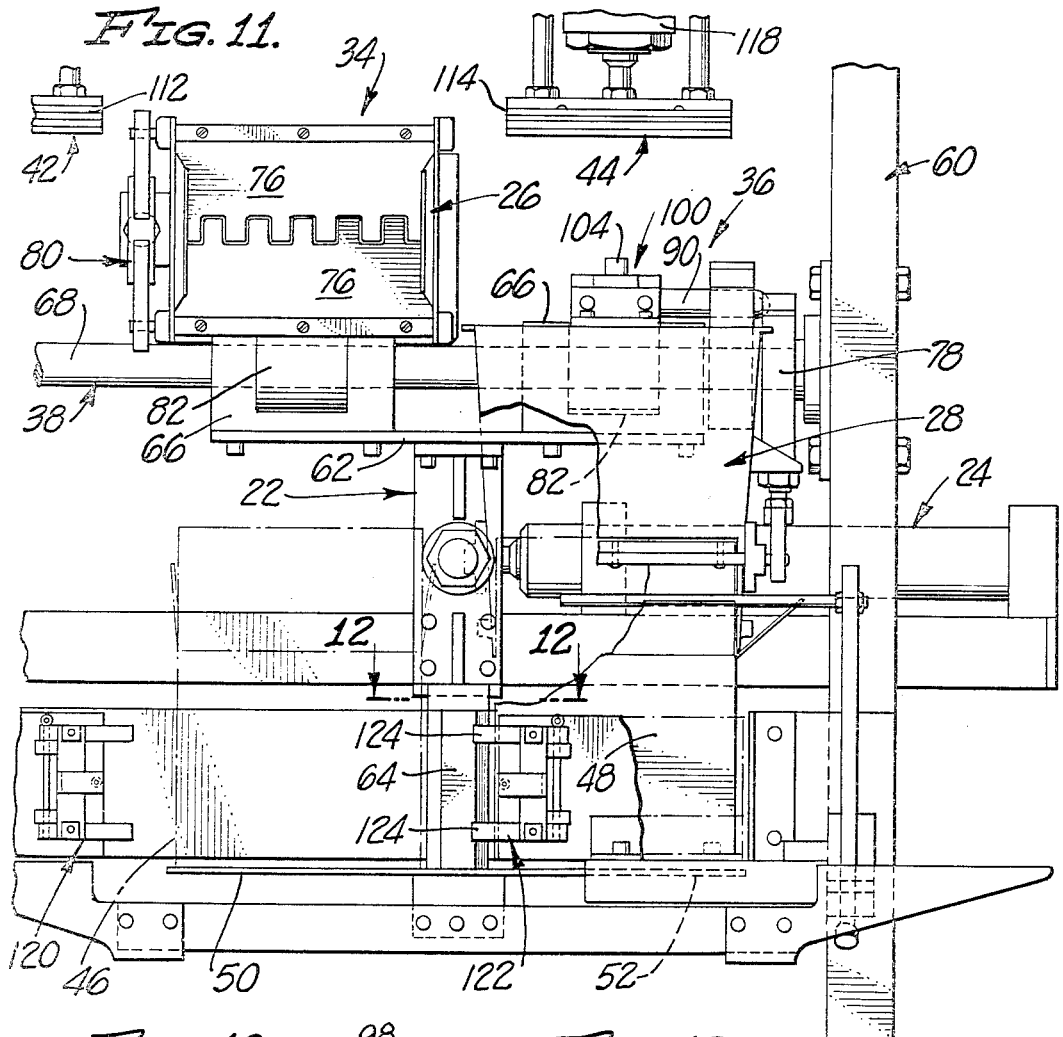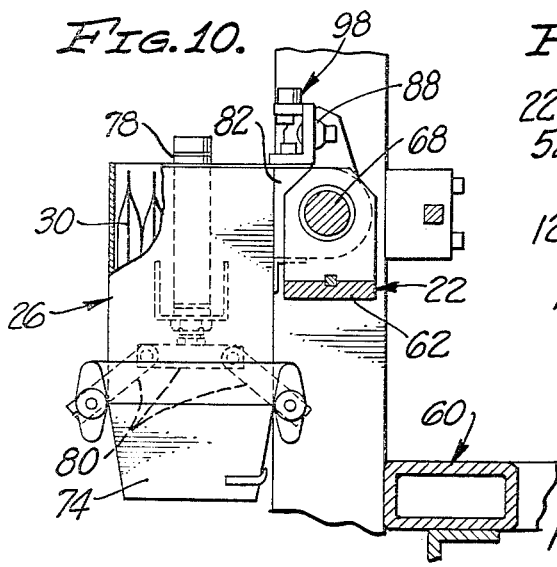
INVENTOR
RUSSELL J. MARTIN
BY HIS ATTORNEYS
HARRIS, KIECH, RUSSELL & KERN

United States Patent Office 3,479,795
Patented Nov. 25, 1969

1

3,479,795
AUTOMATIC PACKAGING APPARATUS
Russell John Martin, Waverly, Iowa, assignor to Carnation Company, Los Angeles, Calif., a corporation of Delaware
Filed Oct. 31, 1966, Ser. No. 590,643
Int. Cl. B65b 35/50, 39/00
U.S. Cl. 53—160     9 Claims

ABSTRACT OF THE DISCLOSURE

An apparatus for automatically inserting groups of envelopes or packets into boxes. The apparatus includes two receptacles in side-by-side relation which are shuttled between a common loading station and separate unloading stations respectively located on opposite sides of the loading station, each receptacle being loaded with a group of packets when it is at the common loading station, and being unloaded into a box when it is at the unloading station corresponding thereto. One receptacle is filled with a group of packets while another group is being unloaded from the other receptacle into a box.

---

The present invention relates in general to an automatic packaging machine and, more particularly, to an apparatus for automatically inserting groups of articles into containers. The invention is especially applicable to an apparatus for automatically inserting into boxes groups of envelopes or packets which have previously been filled with any desired material, and will be considered in such connection herein for convenience. However, it will be understood that the invention may be utilized more generally to package various materials, or articles of a wide variety of shapes and sizes, without departing from the spirit thereof.

A primary object of the invention is to provide an automatic packaging apparatus comprising two receptacles in side-by-side relation which are shuttled between a common loading station and separate unloading stations respectively located on opposite sides of the loading station, each receptacle being loaded with a group of articles when it is at the common loading station, and being unloaded into a suitable container when it is at the unloading station corresponding thereto. With this construction, one receptacle is being filled with a group of the articles to be packaged while another group of the articles is being unloaded from the other receptacle into a suitable container, which is an important feature of the invention.

More particularly, an important object of the invention is to provide an automatic packaging apparatus which includes: a supporting structure providing a receptacle loading station and first and second receptacle unloading stations spaced apart in side-by-side relation along a carriage path with the first and second unloading stations respectively located on opposite sides of the loading station; a carriage reciprocable relative to the supporting structure along the carriage path between first and second positions; first and second receptacles mounted on the carriage in side-by-side relation along the carriage path, the first receptacle being at the first unloading station and the second receptacle being at the loading station when the carriage is in its first position, and the first receptacle being at the loading station and the second receptacle being at the second unloading station when the carriage is in its second position; means for reciprocating the carriage between its first and second positions; loading means for loading groups of articles into the first and second receptacles when they are at the loading station; and unloading means for unloading groups of articles from the first and second receptacles into corresponding containers when the receptacles are at their respective unloading stations.

Another object is to provide an automatic packaging apparatus which includes first and second container supports in side-by-side relation on the carriage for supporting containers in positions to receive groups of articles from the first and second receptacles, respectively, at the first and second unloading stations, respectively.

Still another object is to provide an automatic packaging apparatus which includes means for discharging filled containers from the first and second container supports upon movement of the first and second receptacles toward the loading station, respectively.

A further object is to provide an automatic packaging apparatus which includes means for delivering empty containers to the first and second container supports when the first and second receptacles are in the loading station, respectively.

Another important object of the invention is to pivotally mount the first and second receptacles on the carriage for movement between receptacle loading and unloading positions, the first and second receptacles being tilted toward the loading means when they are in their respective loading positions at the loading station and being upright when they are in their respective unloading positions at their respective unloading stations. A related object is to provide an apparatus wherein the first and second container supports are located below the first and second receptacles, respectively, so as to support corresponding containers in positions to receive groups of articles from the first and second receptacles, respectively, when the later are in their respective unloading positions at the first and second unloading stations, respectively.

A further object of the invention is to provide positioning means for positioning the first and second receptacles in their respective loading positions at the loading station and their respective unloading positions at their respective unloading stations. Related objects are to provide a positioning means which includes rotary means paralleling the carriage path and engageable with the first and second receptacles in the first and second positions of the carriage, respectively, for pivoting the receptacles between their respective loading and unloading positions, and to provide a positioning means which includes first and second latch means on the carriage and the first and second receptacles, respectively, for latching the receptacles in their respective loading positions except when they are to be pivoted into their respective unloading positions.

The foregoing objects, advantages, features and results of the present invention, together with various other objects, advantages, features and results thereof which will be evident to those skilled in the packaging art in the light of this disclosure, may be achieved with the exemplary embodiment of the invention described in detail hereinafter and illustrated in the accompanying drawings, in which:

FIGS. 1, 2 and 3 are semidiagrammatic perspective views illustrating successive events in the operation of the automatic packaging apparatus of the invention;

FIG. 4 is a fragmentary elevational view of the automatic packaging machine of the invention;

FIGS. 5 and 6 are fragmentary sectional views respectively taken along the arrowed lines 5—5 and 6—6 of FIG. 4;

FIG. 7 is a mirror image of a fragmentary view taken as indicated by the arrowed line 7—7 of FIG. 5;

FIG. 8 is a view similar to FIG. 7, but showing various parts in different operating positions;

FIG. 9 is a sectional view taken as indicated by the arrowed line 9—9 of FIG. 8;

FIG. 10 is a fragmentary sectional view taken as indicated by the arrowed line 10—10 of FIG. 4;

FIG. 11 is a fragmentary elevational view similar to FIG. 4, but showing various parts in different operating positions; and FIG. 12 is an enlarged, fragmentary sectional view taken as indicated by the arrowed line 12—12 of FIG. 11.

Referring initially to FIGS. 1 to 3 of the drawings, the automatic packaging apparatus or machine of the invention is designated generally therein by the numeral 20 and includes a reciprocable carriage 22 which is shuttled back and forth between first and second positions by a carriage reciprocating means 24. The first position of the carriage 22 is shown in FIGS. 1 and 2 of the drawings, and the second position of the carriage is shown in FIG. 3 thereof.

First and second receptacles 26 and 28 for packets 30, or other articles, are mounted on the carriage 22 in side-by-side relation. When the carriage 22 is in its first position, FIGS. 1 and 2, the first receptacle is at a first unloading station 32 and the second receptacle 28 is at a loading station 34. When the carriage 22 is in its second position, FIG. 3, the first receptacle 26 is at the loading station 34 and the second receptacle 28 is at a second unloading station 36. The various stations 32, 34 and 36 are positioned in side-by-side relation with the first and second unloading stations 32 and 36 respectively disposed on opposite sides of the common loading station 34. It will be apparent that, with this construction, one of the receptacles 26 and 28 can be loaded with packets 30 at the loading station 34 while the other is being unloaded at the corresponding unloading station 32 or 36.

The receptacles 26 and 28 are pivotally mounted on the carriage 22 for movement between upright unloading positions and tilted loading positions. FIGS. 1 and 2 show the first receptacle 26 in its upright unloading position and show the second receptacle 28 in its tilted loading position. FIG. 3 shows the first receptacle 26 in its tilted loading position and shows the second receptacle 28 in its upright unloading position. The receptacles 26 and 28 are pivoted between their tilted loading positions and their upright unloading positions by a receptacle positioning means 38 which is partially shown in FIGS. 1 to 3 and which will be described in detail hereinafter.

When each of the receptacles 26 and 28 is in its loading position at the common loading station 34, it is tilted toward a common receptacle loading means 40 for delivering packets 30 thereinto seriatim until a predetermined number, such as six, is reached.

When the first and second receptacles 26 and 28 are in their respective unloading positions at their respective unloading stations 32 and 36, they are adapted to have groups of packets 30 discharged therefrom by first and second receptacle unloading means 42 and 44, respectively. FIGS. 1 and 2 illustrate how a group of packets 30 is discharged from the first receptacle 26 into a box 46, or other container, and FIG. 3 shows a group of packets about to be discharged from the second receptacle 28 into a box 48.

The packaging machine 20 includes first and second container supports 50 and 52 mounted on the carriage 22 in side-by-side relation below the first and second receptacles 26 and 28, respectively, for supporting the corresponding boxes 46 and 48 in positions to receive groups of packets 30 from the first and second receptacles, when the latter are in their respective unloading positions at the first and second unloading stations 32 and 36, respectively.

As the carriage 22 is moved from its first position to its second position, a filled container on the first container support 50 is discharged therefrom onto a takeaway conveyor means 54, this condition being illustrated in FIG. 3 of the drawings. Conversely, as the carriage 22 moves from its second position toward its first position, a filled container is discharged onto the takeaway conveyor means 54 from the second container support 52. As will be apparent, as the carriage 22 returns from the position of FIG. 3 to the position of FIG. 1, the box 48 will be discharged from the second container support 52 onto the takeaway conveyor means 54. Discharge of the filled containers is effected by restraining them against movement with their corresponding container supports 50 and 52, as will be described hereinafter.

While each of the receptacles 26 and 28 is being filled with packets 30 at the loading station 34, an empty container is delivered to the corresponding container support 50 or 52 by a container feeding means 56, FIG. 2. As shown in that figure, the container feeding means 56 is delivering the box 48 to the second container support 52 while the second receptacle 28 is being loaded with packets 30 at the loading station 34.

The foregoing completes a general description of the structure and mode of operation of the automatic packaging machine 20. The machine will now be described in more detail with reference to FIGS. 4 to 12 of the drawings.

The automatic packaging machine 20 includes a supporting structure or frame 60 on which its various components are mounted. The carriage 22 is a generally T-shaped frame having an upper crossbar 62 paralleling the path of movement of the carriage. Depending from the crossbar 62 is a stepped leg 64 to the lower end of which the first and second container supports 50 and 52 are suitably connected. The first and second container supports 50 and 52 are shelf-like members extending in opposite directions from the lower end of the carriage leg 64.

Mounted on the ends of the upper crossbar 62 of the carriage 22 are yoke-like bearings 66, FIG. 4, spaced apart along the carriage path. The bearings 66 are slidable along a shaft 68 paralleling the carriage path and rotatably mounted on the frame 60, the shaft 68 also forming a part of the receptacle positioning means 38 as will be described hereinafter.

In addition to being guided along its path by the shaft 68, the carriage 22 is guided by a track 70, FIG. 6, opposite sides of which are engaged by rollers 72 on the carriage leg 64.

The carriage reciprocating means 24 shuttles the carriage 22 back and forth along the shaft 68 and the track 70, between the hereinbefore-discussed first and second positions of the carriage. The carriage reciprocating means 24 is shown as being simply a hydraulic or pneumatic ram interconnecting the carriage leg 64 and the frame 60.

The first and second receptacles 26 and 28 are bucket-like containers of rectangular cross section to receive groups of an appropriate number, such as six, of the packets 30. The tops of the receptacles 26 and 28 are open to permit insertion of the packets 30 thereinto, as shown in FIG. 6. The end walls of the receptacles 26 and 28 are provided at their bottoms with tapered extensions 74, FIG. 6, to facilitate insertion of the lower ends of the receptacles into the open upper ends of the boxes 46 and 48, or other containers.

As best shown in FIGS. 4 and 11, each of the receptacles 26 and 28 is provided at its bottom with two trap doors 76 respectively pivotally mounted on the side walls thereof. The trap doors 76 of each receptacle 26 or 28 are opened, when it is desired to unload a group of packets 30 from such receptacle, by a ram 78 mounted on one end wall of such receptacle. Each ram 78 is connected to the corresponding trap doors 76 by a linkage assembly 80 which opens the trap doors upon extension of such ram.

Mounted on one side wall of each receptacle 26 or 28 adjacent the upper end thereof is a bearing 82 which is disposed between the arms of the corresponding yoke-like bearing 66 and through which the shaft 68 extends. With this arrangement, the receptacle 26 and 28 are reciprocable with the carriage 22 along the shaft 68, and are pivotable relative to the carriage 22, on the shaft 68, between their respective loading and unloading positions.

As previously pointed out, when the receptacles 26 and 28 are in their loading positions at the loading station 34, they are tilted toward the loading means 40. This is illustrated best in FIG. 6 of the drawings, the receptacle 28 being shown therein tilted into a substantially horizontal loading position wherein its open upper end faces the loading means 40. It will be noted that the receptacle 28 is positioned somewhat below the loading means 40 so that as successive packets 30 are discharged from the loading means into the receptacle, they are stacked on the packets therebeneath.

The loading means 40 is shown as comprising simply a loading conveyor 84 which conveys the packets 30 toward the loading station 34 in single file. The loading conveyor 84 discharges successive packets 30 into a loading chute 86 which extends slightly into the receptacle 26 or 28 being loaded, as illustrated in FIG. 6.

The automatic packaging machine 20 may be provided with any suitable counting means, not shown, for counting the packets 30 as they are delivered to the loading station 34 by the loading means 40. After the desired number of packets 30, e.g., six packets, has been loaded into the particular receptacle 26 or 28 which is in its loading position at the loading station 34, the counting means may cause the control system of the machine 20 to shift the carriage 22 to its next position and to bring the next receptacle 26 or 28 into its loading position at the loading station 34. The provision of such a counting means and control system is well within the skill of the art and, therefore, no disclosure thereof is presented herein.

Turning now to a consideration of the receptacle positioning means 38, which places the receptacles 26 and 28 in their tilted loading positions at the loading station 34 and in their upright unloading positions at the respective unloading stations 32 and 36, the respective receptacles 26 and 28 are provided thereon with pins 88 and 90 which are parallel to the shaft 68 and which are insertable into holes in positioning elements 92 and 94, respectively, on the shaft 68 in the first and second positions, respectively, of the carriage 22. FIG. 4 shows the pin 88 on the receptacle 26 in engagement with the positioning element 92 in the first position of the carriage 22. FIGS. 8, 9 and 11 show the pin 90 on the receptacle 28 in engagement with the positioning element 94 in the second position of the carriage. As shown in FIG. 4, a rotary actuator 96 is mounted on the frame 60 and is connected to one end of the shaft 68, the rotary actuator 96 being adapted to rotate the shaft 68 through an angle corresponding to the angle between the loading and unloading positions of the receptacles 26 and 28.

Thus, when the pin 88 on the receptacle 26 is in engagement with the positioning element 92 on the shaft 68, the rotary actuator 96 may be operated to pivot the receptacle 26 between its tilted loading position and its upright unloading position, this occurring when the carriage 22 is in its first position. When the carriage 22 is in its second position, so that the pin 90 on the receptacle 28 is in engagement with the positioning element 94 on the shaft 68, the rotary actuator 96 may be operated to pivot the receptacle 28 between its tilted loading position and its upright unloading position. Thus, the pivoting of the receptacles 26 and 28 between their respective loading and unloading positions is positive in nature.

As will be apparent from the foregoing, the positioning pins 88 and 90 on the first and second receptacles 26 and 28 are in engagement with their respective positioning elements 92 and 94 only when the receptacles are at their respective unloading stations 32 and 36. Consequently, since it is necessary to maintain the receptacles 26 and 28 in their loading positions when they are at the loading station 34, the receptacle positioning means 38 provides latch means 98 and 100 for latching the respective receptacles 26 and 28 in their tilted loading positions. Except for the fact that the latch means 98 and 100 are reversed in position, they are identical, and only the latch means 100 will be described in detail.

Turning to FIGS. 6 to 8 of the drawings, the latch means 100 comprises a pivoted latch element 102 mounted on the corresponding bearing 66 on the carriage crossbar 62. The latch element 102 is a hook-like element engageable with a latch pin 104 on the corresponding receptacle 28. A tension spring 106 biases the latch element 102 into engagement with the latch pin 104. (Preferably, the spring 106 connects the latch element 102 to the corresponding element of the latch means 98.)

As will be clear from a comparison of FIGS. 7 and 8, when the carriage 22 is in its first position so that the second receptacle 28 is at the loading station 34, as shown in FIG. 7, the latch element 102 is in engagement with the latch pin 104 to hold the receptacle 28 in its tilted loading position. Turning to FIG. 8, upon movement of the carriage 22 to its second position, the latch element 102 engages a latch releasing element 108 mounted on the frame 60. This latch releasing element pivots the latch element 102, in opposition to the action of the spring 106, out of engagement with the latch pin 104. At the same time, the positioning pin 90 on the receptacle 28 engages the positioning element 94 on the shaft 68. Consequently, despite the fact that the latch means 100 has released the receptacle 28, this receptacle will remain in its loading position until it is pivoted into its upright unloading position by the rotary actuator 96. At the same time, the receptacle 26 is at the loading station 34, latched in its loading position, and its positioning pin 88 is disengaged from the corresponding positioning element 92. Consequently, pivoting of the receptacle 28 from its loading position into its unloading position does not affect the receptacle 26.

It will thus be apparent from the foregoing that the receptacle positioning means 38 positively pivots the receptacles 26 and 28 between their loading and unloading positions while they are at their respective unloading stations 32 and 36. When the receptacles 26 and 28 are at the loading station 34, they are disengaged from the rotary actuator 96 of the positioning means 38 and are latched in their tilted loading positions by the respective latch means 98 and 100.

The first and second unloading means 42 and 44 simply comprise pusher elements 112 and 114 which are insertable into the open ends of the respective receptacles 26 and 28, the pusher elements 112 and 114 being shown as actuated by rams 116 and 118, respectively. It will be understood that whenever one of the rams 116 and 118 is actuated, the corresponding trap-door ram 78 is actuated to open the corresponding trap doors 76. The stroke of the unloading rams 116 and 118 is such as to cause the corresponding pusher elements 112 and 114 to displace groups of packets 30 from the corresponding receptacles 26 and 28 into corresponding containers, such as the boxes 46 and 48, on the corresponding container supports 50 and 52.

As previously described, the filled boxes drop from the respective container supports 50 and 52 onto the takeaway conveyor means 54 as the corresponding receptacles 26 and 28 are moved toward the loading station 34. To accomplish this, the automatic packaging machine 20 includes container discharge means 120 and 122 for respectively discharging filled containers from the container supports 50 and 52. As best shown in FIGS. 11 and 12 of the drawings, the container discharge means 122 simply comprises pivoted hooks 124 which hook over the end of the corresponding container, such as the box 48, nearest the carriage leg 64. These hooks 124 are provided with beveled ends 126 which permit them to ride over the side of the box 48 as the carriage moves into its second position, and are biased into hooking engagement with the box by a spring means 128. Upon subsequent movement of the carriage 22 toward its first position, the hooks 124 drag the filled box 48 off the container support 52 so that it can drop onto the takeaway conveyor means 54. The container discharge means 120 has a similar construction and operates in a similar manner.

The container feeding means 56, for delivering containers to be filled to the container supports 50 and 52, may be of any suitable type. For example, it is shown in FIG. 2 as comprising a pusher element 130 operable by a ram 132, empty containers being supplied to the container feeding means in any suitable manner. As previously discussed, an empty container is delivered to each of the container supports 50 and 52 when the carriage 22 is in a position such that the corresponding receptacle 26 or 28 is at the loading station 34.

Since the over-all operation of the automatic packaging machine has already been explained, it is thought unnecessary to repeat it at this point in the description.

Although an exemplary embodiment of the invention has been disclosed herein for purposes of illustration, it will be understood that various changes, modifications and substitutions may be incorporated in such embodiment without departing from the spirit of the invention.

I claim:

1. In an apparatus for packaging articles in containers, the combination of:
   (a) a supporting structure providing a receptacle loading station and first and second receptacle unloading stations respectively located on opposite sides of said loading station in side-by-side relation therewith;
   (b) first and second receptacles reciprocable as a unit between a first position wherein said first receptacle is at said first unloading station and said second receptacle is at said loading station, and a second position wherein said first receptacle is at said loading station and said second receptacle is at said second unloading station;
   (c) means for reciprocating said receptacles between said first and second positions;
   (d) means for loading groups of articles into said first and second receptacles when they are respectively at said loading station;
   (e) first and second container supports in side-by-side relation connected to and reciprocable as a unit with said first and second receptacles for supporting corresponding containers in positions to receive groups of articles from said first and second receptacles, respectively, at said first and second unloading stations, respectively; and
   (f) relatively movable means at said unloading station for unloading groups of articles from said first and second receptacles into corresponding containers on said first and second container supports when said receptacles are at their respective unloading stations.

2. A packaging apparatus as set forth in claim 1 including means for discharging filled containers from said first and second container supports upon movement of said first and second receptacles toward said loading station, respectively.

3. In an apparatus for packaging articles in containers, the combination of:
   (a) a supporting structure providing a receptacle loading station and first and second receptacle unloading stations spaced apart in side-by-side relation along a carriage path with said first and second unloading stations respectively located on opposite sides of said loading station;
   (b) a carriage reciprocable relative to said supporting structure along said carriage path between first and second positions;
   (c) first and second receptacles pivotally mounted on said carriage in side-by-side relation for movement between receptacle loading and unloading positions;
   (d) said first receptacle being at said first unloading station and said second receptacle being at said loading station when said carriage is in said first position, and said first receptacle being at said loading station and said second receptacle being at said second unloading station when said carriage is in said second position;
   (e) means for reciprocating said carriage between said first and second positions;
   (f) positioning means for positioning said first and second receptacles in their respective loading positions at said loading station and their respective unloading positions at their respective unloading stations;
   (g) loading means for loading groups of articles into said first and second receptacles when they are in their respective loading positions at said loading station; and
   (h) unloading means for unloading groups of articles from said first and second receptacles into corresponding containers when said receptacles are in their respective unloading positions at their respective unloading stations.

4. A packaging apparatus as defined in claim 3 wherein said first and second receptacles are tilted toward said loading means when they are in their respective loading positions at said loading station, and are upright when they are in their respective unloading positions at their respective unloading stations.

5. A packaging apparatus according to claim 4 including first and second container supports in side-by-side relation on said carriage below said first and second receptacles, respectively, for supporting corresponding containers in positions to receive groups of articles from said first and second receptacles, respectively, when the latter are in their respective unloading positions at said first and second unloading stations, respectively.

6. A packaging apparatus as set forth in claim 5 including means for discharging filled containers from said first and second container supports upon movement of said carriage toward said second and first positions, respectively.

7. A packaging apparatus as set forth in claim 3 wherein said positioning means includes rotary means paralleling said carriage path and engageable with said first and second receptacles in said first and second positions of said carriage, respectively.

8. A packaging apparatus according to claim 7 wherein said positioning means includes first and second latch means on said carriage and said first and second receptacles, respectively, for latching said receptacles in their respective loading positions.

9. A packaging apparatus as defined in claim 8 including means for releasing said first latch means in said first position of said carriage and for releasing said second latch means in said second position of said carriage.

References Cited

UNITED STATES PATENTS

| 836,241 | 11/1906 | Camp | 53—202 X |
|---|---|---|---|
| 1,090,855 | 3/1914 | Jagenberg | 53—160 |
| 2,860,460 | 11/1958 | Rambold | 53—160 X |
| 3,001,350 | 9/1961 | Heblij | 53—258 X |
| 3,088,257 | 5/1963 | Penley | 53—258 X |
| 3,107,793 | 10/1963 | Frank | 53—164 X |
| 3,225,891 | 12/1965 | Hickin | 53—164 X |
| 2,896,384 | 7/1959 | Carlsen | 53—59 |
| 3,323,283 | 6/1967 | Johnson | 53—250 X |
| 3,396,505 | 8/1968 | McCrudden | 53—164 X |
| 3,435,584 | 4/1969 | Prechter | 53—62 |

FOREIGN PATENTS 1,109,596   6/1961   Germny.

WAYNE A. MORSE, Jr., Primary Examiner

U.S. Cl. X.R.

53—164, 202, 244, 250, 273